United States Patent Office 3,214,410
Patented Oct. 26, 1965

3,214,410
POLYMERS OF DIALDEHYDES AND METHOD
OF PREPARING SAME
Jerry N. Koral, Stamford, Conn., assignor to American
Cyanamid Company, Stamford, Conn., a corporation
of Maine
No Drawing. Filed July 10, 1962, Ser. No. 208,938
14 Claims. (Cl. 260—67)

This invention relates to a novel process for the aldol polymerization of various dialdehyde monomers and to the polymers produced thereby. More particularly, this invention relates to a novel process for the aldol polymerization of various saturated, unsaturated, substituted and unsubstituted dialdehyde monomers and to the novel aldol polymers produced thereby. Still more particularly, this invention relates to a novel group of polymers and to the process for the production thereof.

The spontaneous polymerization of various dialdehyde monomers is known in the art. The polymers produced by these spontaneous reactions are, however, very commercially unattractive in that they are infusible and/or thermally unstable. Since the polymers are infusible they are incapable of being molded or sheeted into useful products. Additionally, the instability of the polymers causes them to break down into monomeric form upon the application of heat thereto, while some completely depolymerize when contacted with water at room temperature.

I have found that by polymerizing dialdehyde monomers by my novel polymerization process, products can be produced which are thermally stable and fusible. These novel polymers have excellent solvent resistance and may be molded and sheeted into transparent and flexible articles. The process is economically feasible, may be carried out at room temperature, and enables the production of new polymers in reasonable yields. The polymers are thermoplastic in nature and may be used in all fields wherein thermoplastic materials have heretofore been applicable.

I have found that by polymerizing dialdehydes according to my novel process, polymers thereof can be produced which are thermally stable and fusible. Additionally, these novel polymers have excellent solvent resistance and may be molded into articles which are transparent and flexible. My novel process results in the production of a novel polymer at a relatively economic rate.

It is an object of this invention to provide a novel process for the polymerization of dialdehydes.

It is a further object of the present invention to produce novel polymers of dialdehydes by a novel aldol polymerization process, said polymers being fusible, thermally stable, moldable, solvent resistant and relatively economically produced.

It is still a further object of this invention to provide a novel process for the aldol polymerization of various saturated, unsaturated, substituted and unsubstituted dialdehydes and the products produced thereby.

These and further objects of this invention will become more apparent to those skilled in the art upon reading the more detailed description set out hereinbelow.

The monomeric dialdehydes which may be polymerized according to my novel process include those represented by the formulae (I) 

wherein R represents a methylene radical and $n$ is a whole positive integer of from 1 to 10, inclusive, and (II) 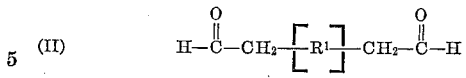

wherein $R^1$ represents an alkenylene radical having from 2 to 8 carbon atoms, inclusive, each of said R and $R^1$ radicals bearing up to 10 substituents selected from the group consisting of halogen, hydroxy, cycloalkyl, aryl, alkoxy, alkaryl and aralkyl radicals. It is to be understood that the terms "alkylene" and "alkenylene" include both branched and straight chain radicals such as isobutylene, 2,4-dimethyl hexylene, 3,7-dimethyloctylene, 1-propylbutenylene radicals and the like. It is to be further understood that any individual dialdehyde monomer may bear two or more of the above cited substituents and still fall within the scope of the present invention.

A preferred group of the dialdehyde monomers to be used in the process of the present invention comprises those dialdehyde monomers wherein the two aldehyde groups are each attached to a terminal carbon atom of an unsubstituted, aliphatic, saturated alkylene chain of from 1 to 10 carbon atoms.

Examples of dialdehyde monomers which are represented by Formulae I and II, above, include malonaldehyde, succinaldehyde, glutaraldehyde, adipaldehyde, pimelaldehyde, suberaldehyde, azelaldehyde, sebacaldehyde, dodecanedial, β-hydromuconaldehyde, 2-ethyl-β-hydromuconaldehyde, 2-hydroxyadipaldehyde, 3-methoxypimelaldehyde, 3-chloro-2,4-dimethylglutaraldehyde, 2-butyl-2-ethylglutaraldehyde, 2-cyclohexylsuberaldehyde, 5-phenylsuberaldehyde, 2,4-ditolylsuberaldehyde, 3-(methylbenzyl)adipaldehyde, 3-phenylsuberaldehyde, 3,4-ditolyladipaldehyde, 3-hydroxy-2,4-dimethylglutaraldehyde, 3-bromo-5-ethoxy-8-benzyl-dodecanedial and the like. These and other useful dialdehydes are disclosed in and may be prepared according to various processes known in the art and exemplified by U.S. Patents 2,546,018, 2,702,823 and 2,639,297.

The dialdehydes represented by Formulae I and II above, may be polymerized alone or in admixture with one another by my novel procedure set out more fully hereinbelow.

My novel process comprises contacting a dialdehyde monomer, or mixtures of different dialdehyde monomers, in water solution, water suspension or water-solvent systems, with a basic catalyst at a temperature ranging from about −20° C. to +80° C.

The critical feature of my process is that water, in amounts of at least 5%, by volume, of the total reaction media, must be present during the polymerization reaction. I have found that polymerization of the dialdehyde monomer in a reaction media containing at least 5%, by volume, of water and a basic catalyst results in the production of stable, fusible, polymeric products heretofore not known. Lower amounts of water result in the production of infusible products, probably due to an excessive degree of cross-linking, which products exhibit inferior properties similar to those of the prior art, mentioned above. Some of the dialdehyde monomers which may be polymerized according to my novel process are unstable at room temperature and must be treated somewhat differently than the stable monomers, in regard to the monomer concentration thereof during polymerization. That is to say, generally, the monomer concentration utilized in my novel process ranges from about 5% to 95%, by volume, preferably 10% to 70%, by volume, of the reaction media, when the stable dialdehyde monomers are used (e.g. suberaldehyde), and 5% to 25%, by volume, preferably 10% to 20%, by volume, when unstable dialdehyde monomers (e.g. glutaraldehyde), are used. The stable and unstable dialdehyde monomers are well known in the art and may be determined by reference to any standard text.

The polymerization may be carried out, utilizing as the reaction media, a water suspension, a water dispersion or a water-solvent mixture of the charged dialdehyde monomer and catalyst. It is also possible to run the reaction in solvent dispersions with water, however, it should be understood that no solvent need be used when a water dispersion or water suspension is employed. That is to say, fusible, stable polymers can be produced in the absence of a solvent, using a water suspension or dispersion, as long as the water concentration of the reaction media is at least 5%, by volume, at the start of the polymerization reaction.

When solvents are used, as mixtures or dispersions with water, any material which is a solvent for the dialdehyde monomer may suffice with such materials as the aliphatic alcohols, e.g. methanol, ethanol, dioxane, acetone, acetonitrile and the like, being exemplary.

The temperature, as mentioned above, employed during the novel polymerization process of the present invention ranges from about −20° C. to +80° C., preferably about 0° C. to about 25° C. Atmospheric pressure is generally applicable in the process, however, subatmospheric or superatmospheric pressures may be used, where necessary or desirable, without materially detracting from the efficacy of the process or the excellent properties of the polymers produced thereby.

The basic catalyst employed during the process is utilized in concentrations ranging from about 1 mole percent to 50 mole percent, preferably 2 mole percent to 32 mole percent, of catalyst per mole of dialdehyde monomer charged.

The basic catalyst employed should have a pKa of at least about 8.0, and applicable catalysts include such compounds as the alkali metal hydroxides, i.e., NaOH, KOH, LiOH, RbOH, CsOH, the linear alkyl amines, e.g., triethylamine, tetramethyl guanidine, hexamethyl biquanide, heptamethyl isobiquanide, the trialkyl phosphines having the formula

wherein $R^1$, $R^2$ and $R^3$ are the same or different alkyl radicals having from 1 to 20 carbon atoms, inclusive, such as ethyldimethyl phosphine, methyldiethyl phosphine, triisobutyl phosphine, tripropyl phosphine, tributyl phosphine, triamyl phosphine, trimethyl phosphine, triethyl phosphine and the like. The catalysts may be added as such to the reaction media, however, it is sometimes preferable, for reasons of ease and economy, to add the catalyst as an aqueous solution, the amount of water present being such that the total reaction media contains at least 5%, by volume of water, as enumerated above. The water necessary to the reaction can also be added via an aqueous solution of the dialdehyde monomer feed.

The reaction is relatively rapid and generally is complete in from about 15 minutes to 76 hours, with agitation sufficient to allow complete contact between the monomer and the catalyst being continuously applied, the longer times usually being used to insure complete reaction.

Although the reaction may be carried out in the presence of air, it is preferred to conduct the polymerization under an inert gaseous atmosphere. Any non-oxygen containing inert gas may be used for this purpose with such materials as nitrogen, argon, neon, the gaseous hydrocarbons, i.e. propane, butane, etc. and the like, being exemplary. By "non-oxygen containing inert gas" is meant any inert gas which does not contain oxygen in admixture therewith or in combined form.

The novel polymers encompassed by the present invention have the recurring units of following formulae, as devised by the interpretation of information received by infrared spectrum analysis;

(III)
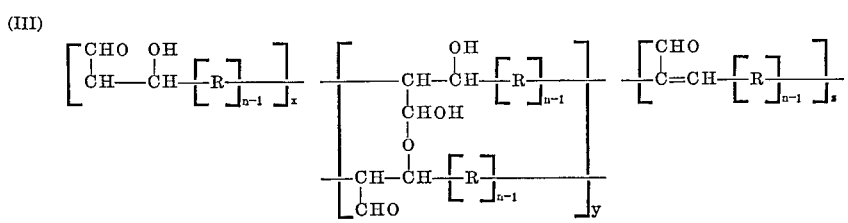

wherein R and $n$ are as defined above in regard to Formula I, and the ratio of $x:y:z$ ranges from about 1:0.5–10.0:0.5–8.0 and (IV)
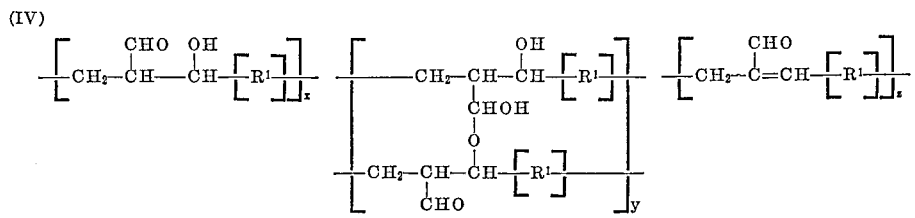

wherein $R^1$ is as defined above in regard to Formula II and the ratio of $x:y:z$ ranges from about 1:05–10.0:0.5–8.0

This is consistent with known aldol condensation reactions wherein water elimination, and cross-linking take place via hemiacetal formation. The elimination of water accounts for the presence of the conjugated carbonyl groups while under the basic polymerization conditions, hemiacetal cross-links results in the ether linkages. This slight cross-linking probably accounts for the limited solubility of the polymers in many organic solvents.

The novel polymers of the present invention produced utilizing my novel process are generally amorphous solids having softening points between about 95° C. and about 170° C. depending on the monomer polymerized. The polymers are water-white to yellow in color and, when molded, produce brittle to flexible transparent moldings. The polymers are substantially insoluble in most common organic solvents but can be dissolved in phenol, o-chlorophenol and benzyl alcohol.

The polymers of the present invention find use in such fields as moldings, adhesives, films, fibers, foils, laminating resins, and the like and may be modified by incorporating therein such materials as dyes, fillers, lubricants, and the like.

The following examples are set forth for purposes of illustration only and are not to be construed as limitations on the present invention except as set forth in the appended claims. All parts and percentages are by weight unless otherwise specified.

*Example 1*

To a suitable reaction vessel equipped with a nitrogen bubbler, stirrer and rubber serum stopper are added 0.97 part of suberaldehyde, 0.80 part of methanol and 2 parts of water. The contents of the vessel are agitated, cooled to 0° C. and purged with nitrogen for 15 minutes. To this cooled mixture is then added 0.25 part of 50% aqueous NaOH (pKa=13.5). An opaque resin forms immediately. After 15 minutes the resin is washed with water several times until free of NaOH. The resin is then dried in a vacuum oven at 30° C. for 24 hours. A polymer is recovered in a yield of 86%. It has a softening point about 115° C. The polymer has an intrinsic viscosity of 0.081 dl./g. in benzyl alcohol at 30° C. Infrared spectrum shows hydroxyl groups (3400 cm.$^{-1}$), carbonyl groups (1720 cm.$^{-1}$), conjugated carbonyl groups (1675 cm.$^{-1}$), ether groups (1150 cm.$^{-1}$) and unsaturation (1625 cm.$^{-1}$). This indicates that the polymer is composed of units of the formula

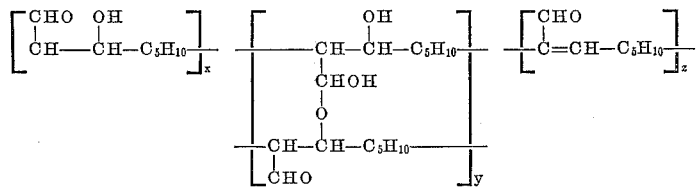

wherein the ratio of $x$:$y$:$z$ is 1:1.5:1. At 95 to 100° C. and 4800 p.s.i., a clear, flexible disc of the polymer is formed in a mold.

*Example 2*

To a suitable reaction vessel, equipped as described in Example 1, are added 0.97 part of suberaldehyde, 0.80 part of methanol and 2 parts of water. The contents of the vessel are agitated, cooled to 0° C. and purged with nitrogen for 15 minutes. To this cooled mixture is then added 0.14 part of tetramethyl guanidine (pKa=13.6). An opaque resin forms immediately. After 30 minutes the resin is washed with water several times until free of catalyst. The resin is then vacuum dried in a vacuum oven at 30° C. for 24 hours. A polymer is recovered in a yield of 100%. It has a softening point of about 106° C. The polymer has an intrinsic viscosity of 0.066 dl./g. in benzyl alcohol at 30° C. The infrared spectrum is similar to that described in Example 1, indicating the existence of the same type of polymeric structure. At 95–100° C. and 4800 p.s.i., a clear flexible, disc of the polymer is formed in a mold.

*Example 3*

To a suitable reaction vessel, equipped as described in Example 1, are added 0.97 part of suberaldehyde, 0.2 part of water and 1.76 parts of methanol. The contents of the vessel are agitated, cooled to 0° C., and purged with nitrogen for 15 minutes. To this cooled mixture is then added 0.05 part of 25% aqueous KOH. An opaque resin precipitate after seven minutes. At the end of three hours, the resin is washed with water several times until free of catalyst and monomer. The resin is then dried in a vacuum oven at 30° C. for 24 hours. A polymer is recovered in a yield of 78%. It has a softening point of 108° C. The infrared spectrum and corresponding structure is similar to that described in Example 1. At 95 to 100° C. and 4800 p.s.i., a clear, flexible, disc of the polymer is formed in a mold.

*Example 4 (comparative)*

To a suitable reaction vessel, equipped as described in Example 1, are added 0.97 part of suberaldehyde and 0.80 part of methanol. The contents of the flask are agitated, cooled to 0° C. and purged with nitrogen for 15 minutes. To this cooled mixture is then added 0.2 part of 50% aqueous NaOH. A total of 4.7%, by volume of water is present in the reaction media. A clear solid polymer forms immediately and becomes opaque after one hour. The polymer is worked several times with water until free of catalyst and monomer. The resin is then dried in a vacuum oven at 30° C. for 24 hours. A polymer is recovered in a yield of 72%. This polymer is insoluble in most organic solvents and is infusible at temperatures up to about 300° C.

*Example 5*

To a suitable reaction vessel, equipped as described in Example 1, are added 20 parts of a 25% aqueous solution of glutaraldehyde and 5.85 parts of acetonitrile. The contents of the flask are agitated, cooled to 0° C. and purged with nitrogen for 15 minutes. To this cooled mixture is then added 0.2 part of 25% aqueous NaOH. The solution is kept at 0° C. for twenty hours. The polymer is washed several times with water until free of catalyst and monomer. The resin is then dried in a vacuum oven at 30° C. for 24 hours. A polymer is recovered in a yield of 10.6%. It is soluble in benzyl alcohol and has a softening point of 162° C. The infrared spectrum and structure of the polymer is similar to that described in Example 1, i.e.

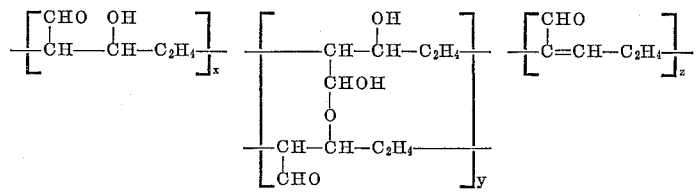

wherein the ratio of $x$:$y$:$z$ is 1:4:2. At 115 to 120° C. and 4800 p.s.i., a clear, brittle disc of the polymer is formed in a mold.

*Example 6*

To a suitable reaction vessel, equipped as described in Example 1, are added 20 parts of a 25% aqueous solution of glutaraldehyde. The contents of the flask are agitated, cooled to 0° C. and purged with nitrogen for 15 minutes. To this cooled mixture is added 0.2 part of tributyl phosphine, pKa=8.4. After 30 minutes precipitate is formed. After 20 hours, the precipitate was washed free of catalyst and unreacted monomer. The resin is dried under vacuum at 30° C. for 24 hours. A polymer is recovered in a yield of 11.0%. The polymer is soluble in benzyl alcohol and hot dimethyl formamide. It has an intrinsic viscosity of 0.088 dl./g. in the former. The resin has a melting point about 152° C. The infrared spectrum and structure is similar to that described in Example 1. At 110° C. and 4800 p.s.i., a clear, brittle disc of polymer is formed.

*Example 7*

To a suitable reaction vessel, equipped as described in Example 1, are added 40 parts of 25% aqueous glutaraldehyde. The contents of the flask are agitated, cooled to 0° C. and purged with nitrogen for 15 minutes. To this cool mixture is added 0.4 part of 25% aqueous NaOH. Polymerization is instantaneous. After 20 hours at 0° C., the polymer is washed to remove excess catalyst and unreacted monomer. The resin is dried under vacuum for 20 hours at 30° C. and a polymer is recovered in a yield of 27.4%. The polymer has an intrinsic viscosity of 0.065 dl./g. in dioxane at 0° C. It has a melting point about 130° C. and an infrared spectrum and structure similar to that described in Example 1.

*Example 8*

To a suitable reaction vessel, equipped as described in Example 1, are added 20 parts of 25% aqueous glutaraldehyde, 0.97 part of suberaldehyde and 5.62 parts of acetone. The contents of the flask are agitated, cooled to 0° C. and purged with nitrogen for 15 minutes. To this cool mixture is added 0.2 part of 25% aqueous NaOH. Polymerization starts immediately. After one hour the polymer is washed to remove excess catalyst and unreacted monomer. The resin is dried under vacuum at 30° C. for 20 hours. The copolymer is brittle and has a

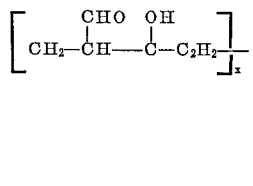

melting point about 120° C. The infrared spectrum and structure is similar to that described in Example 1.

*Example 9 (comparative)*

To a suitable reaction vessel, equipped as described in Example 1, are added 20 parts of 25% aqueous glutaraldehyde. The contents of the flask are agitated, cooled to 0° C. and purged with nitrogen for 15 minutes. To this cool solution is added 0.15 part of pyridine (pKa=5.47). The reaction was stopped after 24 hours. No polymer forms.

*Example 10*

Following the procedure of Example 1, a polymer similar to that produced therein is recovered utilizing (in an equivalent amount) 2-hydroxy suberaldehyde in place of the suberaldehyde used therein.

*Example 11*

Again following the procedure of Example 1, a polymer having a softening point of about 118° C. and an intrinsic viscosity of 0.079 dl./g. in benzyl alcohol at 30° C. is recovered utilizing 3-methoxysuberaldehyde as the feed. The polymer is moldable at 97° C. and 4700 p.s.i.

*Example 12*

Again utilizing the procedure of Example 1, a feed of 3-chloro-2-methylsuberaldehyde is polymerized into a polymer having a softening point of about 121° C. and an intrinsic viscosity of 0.086 dl./g. in benzyl alcohol at 30° C. Infrared analysis indicates a polymer having a ratio of $x:y:z$ of about 1:3:2, and a structure similar to that of the polymer of Example 1.

*Example 13*

2-cyclohexyladipaldehyde is polymerized, following the procedure of Example 1, into a polymer having a softening point of 127° C. and an intrinsic viscosity of 0.073 dl./g. in benzyl alcohol at 30° C. Infrared analysis indicates a structure similar to that of the polymer produced in Example 1, with a ratio of $x:y:z$ of 1:1.2:1.1.

*Example 14*

A polymer (yield 82%), is produced using the procedure set out in Example 1 except that β-hydromuconaldehyde is used as the feed. The polymer softens at 125° C. and has an intrinsic viscosity, in benzyl alcohol at 30° C. of 0.080 dl./g. The infrared analysis indicates a polymer having recurring units of the structure:

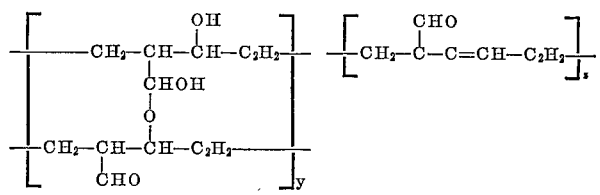

with a ratio of $x:y:z$ of 1:1.4:1.7.

I claim:

1. A fusible, stable aldol polymer of a dialdehyde composed solely of recurring units of the formula

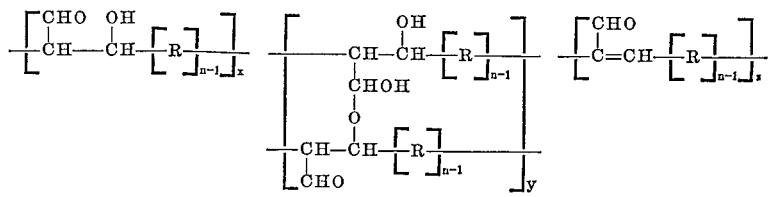

wherein R represents a methylene radical and $n$ is a whole positive integer of from 1 to 10, inclusive said R radical bearing up to 10 substituents selected from the group consisting of halogen, hydroxy, cycloalkyl, aryl, alkoxy, alkaryl, and aralkyl radicals and the ratio of $x:y:z$ ranges from about 1:0.5–10.0:0.5–8.0.

2. A fusible, stable aldol polymer of suberaldehyde composed solely of recurring units of the formula

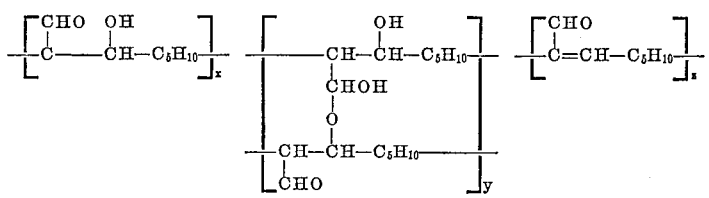

wherein the ratio of $x:y:z$ ranges from about 1:0.5–10.0:0.5–8.0.

3. A fusible, stable aldol polymer of glutaraldehyde composed solely of recurring units of the formula

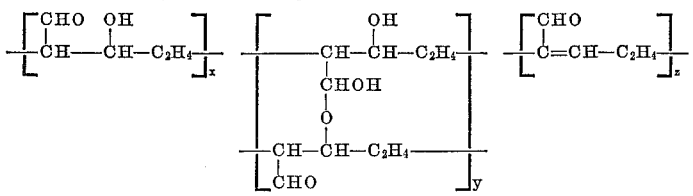

wherein the ratio of $x:y:z$ ranges from about 1:0.5–10.0:0.5–8.0.

4. A process for the preparation of a stable, fusible, aldol polymer of a dialdehyde monomer which comprises contacting a monomeric composition consisting of at least one polymerizable compound having the formula

wherein R represents a methylene radical and $n$ is a whole, positive integer of from 1 to 10, inclusive, said R radical bearing up to 10 substituents selected from the group consisting of halogen, hydroxy, cycloalkyl, aryl, alkoxy, alkaryl, and aralkyl radicals, with a basic polymerization catalyst having a pKa of at least about 8.0 and selected from the group consisting of alkali metal hydroxides, polyalkyl amines, and trialkyl phosphines, at a temperature ranging from about $-20°$ C. to $+80°$ C., the resulting reaction media containing at least 5%, by volume, of water.

5. A process for the preparation of a stable, fusible, aldol polymer of a dialdehyde monomer which comprises contacting a monomeric composition consisting of at least one polymerizable compound having the formula

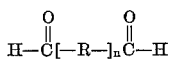

wherein R represents a methylene radical and $n$ is a whole positive integer of from 1 to 10, inclusive, said R radical bearing up to 10 substituents selected from the group consisting of halogen, hydroxy, cycloalkyl, aryl, alkoxy, alkaryl, and aralkyl radicals, with a basic polymerization catalyst having a pKa of at least about 8.0 and selected from the group consisting of alkali metal hydroxides, polyalkyl amines, and trialkyl phosphines, at a temperature ranging from about 0° C. to 25° C., the resulting reaction media containing at least 5%, by volume, of water.

6. A method for the preparation of a stable, fusible, aldol polymer of suberaldehyde which comprises contacting a monomeric composition consisting of suberaldehyde with a basic polymerization catalyst having a pKa of at least about 8.0 and selected from the group consisting of alkali metal hydroxides, polyalkyl amines and trialkyl phosphines, at a temperature ranging from about $-20°$ C. to about $+80°$ C., the resulting reaction media containing at least 5%, by volume, of water.

7. A method for the preparation of a stable, fusible, aldol polymer of suberaldehyde which comprises contacting a monomeric composition consisting of suberaldehyde with a basic polymerization catalyst having a pKa of at least about 8.0 and selected from the group consisting of alkali metal hydroxides, polyalkyl amines and trialkyl phosphines, at a temperature ranging from about 0° C. to 25° C., the resulting reaction media containing at least 5%, by volume, of water.

8. A method for the preparation of a stable fusible, aldol polymer of glutaraldehyde which comprises contacting a monomeric composition consisting of glutaraldehyde with a basic polymerization catalyst having a pKa of at least about 8.0 and selected from the group consisting of alkali metal hydroxides, polyalkyl amines and trialkyl phosphines, at a temperature ranging from about $-20°$ C. to about $+80°$ C., the resulting reaction media containing at least 5%, by volume, of water.

9. A method for the preparation of a stable fusible, aldol polymer of glutaraldehyde which comprises contacting a monomeric composition consisting of glutaraldehyde with a basic polymerization catalyst having a pKa of at least about 8.0 and selected from the group consisting of alkali metal hydroxides, polyalkyl amines and trialkyl phosphines, at a temperature ranging from about 0° C. to 25° C. the resulting reaction media containing at least 5%, by volume, of water.

10. The process of claim 4 wherein said catalyst is sodium hydroxide.

11. The process of claim 6 wherein said catalyst is sodium hydroxide.

12. The process of claim 8 wherein said catalyst is sodium hydroxide.

13. The process of claim 4 wherein said catalyst is tetramethyl guanidine.

14. The process of claim 4 wherein said catalyst is tributyl phosphine.

References Cited by the Examiner

UNITED STATES PATENTS 2,702,823   2/55   Smith et al. _____ 260—67

FOREIGN PATENTS 717,412   10/54   Great Britain.

WILLIAM H. SHORT, *Primary Examiner.*

UNITED STATES PATENT OFFICE
CERTIFICATE OF CORRECTION

Patent No. 3,214,410                                    October 26, 1965

Jerry N. Koral

It is hereby certified that error appears in the above numbered patent requiring correction and that the said Letters Patent should read as corrected below.

Column 8, the formula in claim 2 should appear as shown below instead of as in the patent:

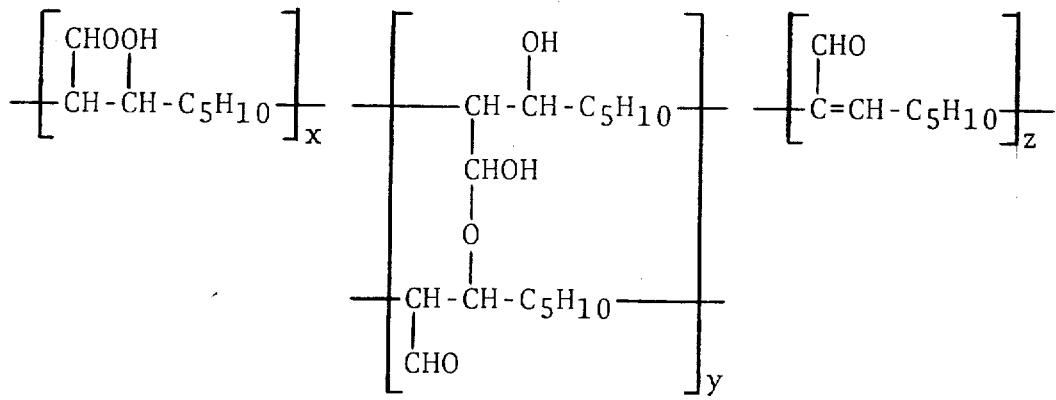

Signed and sealed this 11th day of October 1966.

(SEAL)
Attest:

ERNEST W. SWIDER                              EDWARD J. BRENNER
Attesting Officer                             Commissioner of Patents